Patented Aug. 9, 1927.

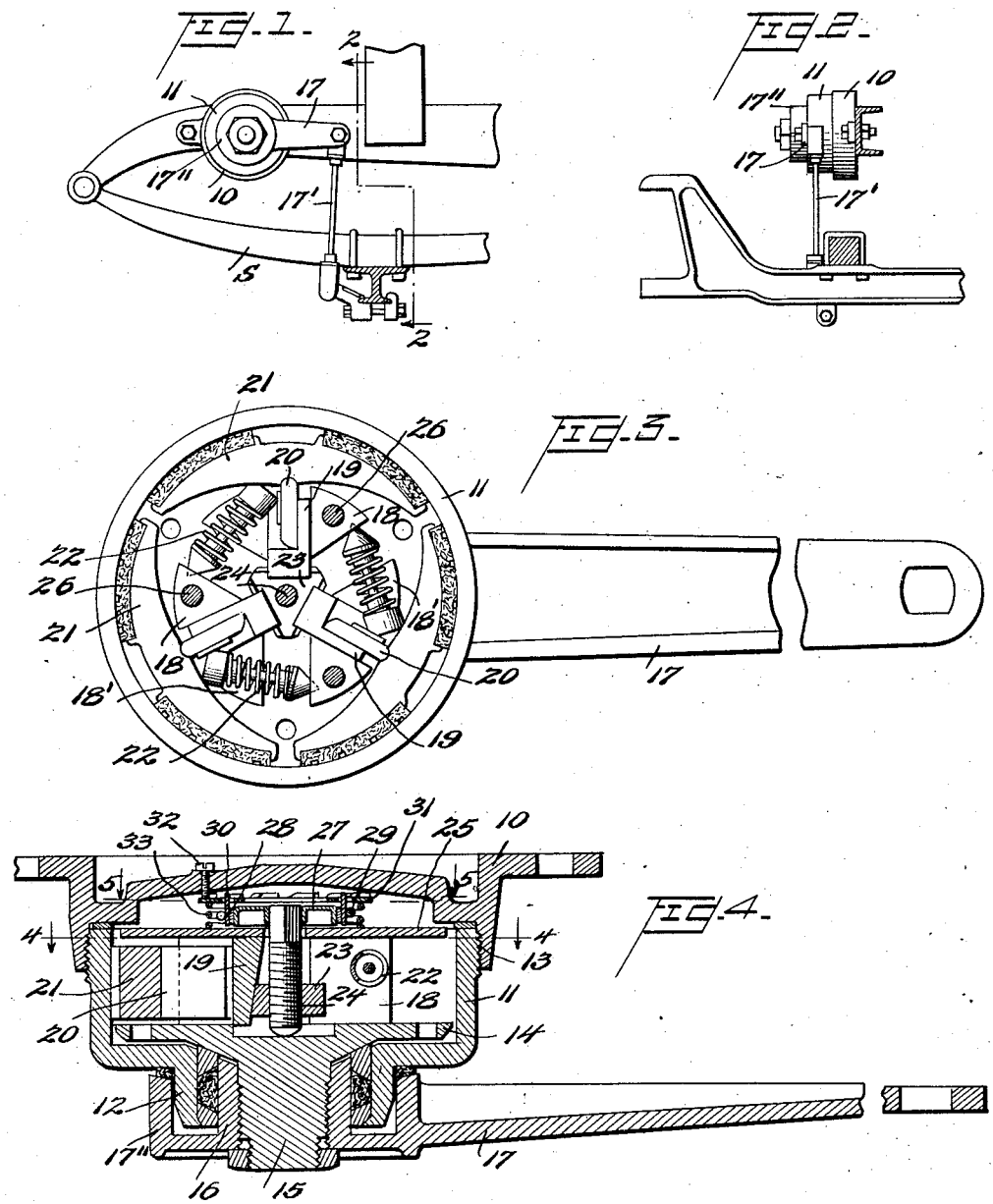

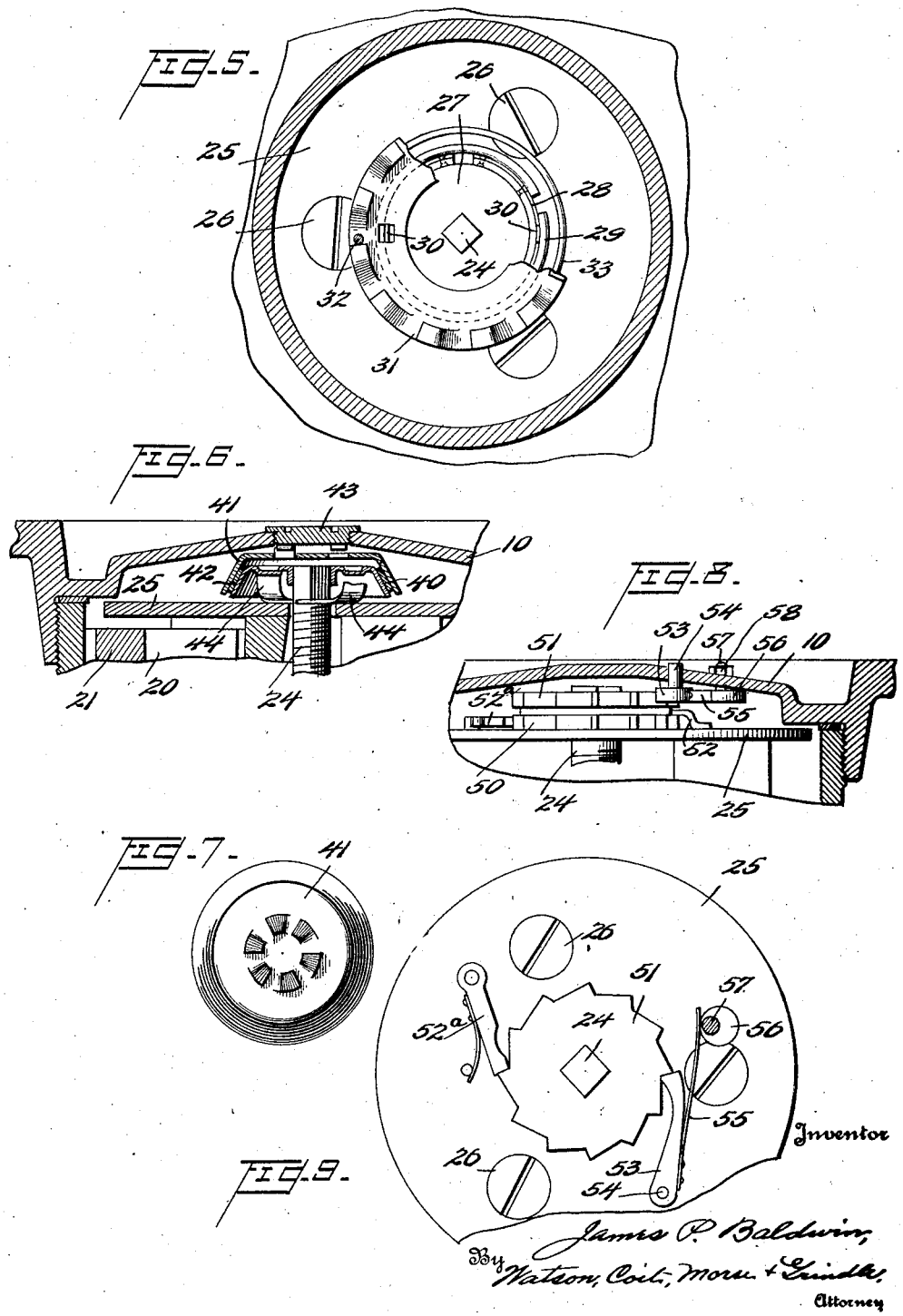

1,638,234

UNITED STATES PATENT OFFICE.

JAMES PIERCE BALDWIN, OF LOS ANGELES, CALIFORNIA.

SHOCK ABSORBER.

Application filed July 28, 1925. Serial No 46,669.

The present invention relates to shock absorbers of the friction type and particularly to automatic adjusting mechanism therefor.

The object of the invention is to provide an accurate and positive adjusting mechanism for shock absorbers of the friction type generally and which is especially adapted for use in a shock absorber of the kind shown in my copending application, Serial No. 18043, filed March 24, 1925. The absorber shown in that application comprises friction shoes operating in a cylindrical casing in combination with strut mechanism for causing the shoes to frictionally engage the casing in one direction of rotation while relieving the friction in the opposite direction. The mechanism of this absorber is housed in a closed casing adapted to be secured to the frame of an automobile and after the absorber has been assembled and tested it is desired that further access to the mechanism for adjustment or any other purpose be unnecessary. Obviously if the absorber is to have a substantial life some internal mechanism must be provided to automatically take up and looseness that may develop in use. The present invention provides an internal automatic adjusting mechanism for absorbers of this type which is positive in its action and which will maintain the absorber in a condition of accurate adjustment during the life of the absorber.

Several different embodiments of the invention will be described hereinafter from which its nature and advantages will be clearly seen by one skilled in the art.

Referring to the accompanying drawings:

Fig. 1 is a fragmentary side view of an automobile frame showing a shock absorber, in which the present invention is embodied, mounted on its front end;

Fig. 2 is a transverse vertical section taken on the line 2—2 of Fig. 1:

Fig. 3 is a section on the line 4—4 of Fig. 4;

Fig. 4 is a horizontal section through the center of the absorber;

Fig. 5 is a section on the line 5—5 of Fig. 4;

Fig. 6 is a fragmentary sectional view showing a different form of the invention;

Fig. 7 is a top view of a ratchet member employed in the construction of Fig. 6;

Fig. 8 is a fragmentary sectional view showing a further modification; and

Fig. 9 is a side view of the mechanism shown in Fig. 8.

The base 10 of the absorber is formed with perforated ears which are bolted to the automobile frame. A cylindrical member 11 having a neck 12 is threaded into the base 10 at 13, the parts 10 and 11 being the relatively stationary or non-rotatable parts of the absorber and constituting a base or housing in which the rotatable parts are mounted.

The rotatable core of the absorber comprises a circular, or disk-like, member 14 having a central boss 15 on which is threaded the hub 16 of an arm 17 connected by a link 17' to a bracket on the car axle, said arm having a circular flange 17'' concentric with hub 16 to provide an annular recess for the neck 12, suitable gaskets and packing being provided to render the joint liquid tight. Formed on or attached to the inner face of disk 14 are three pairs of triangular members 18, 18' between the members of each pair of which is mounted a strut seat 19, the side walls of the seats fitting nicely between the triangular members so that the seats are restrained from movement except in a radial direction. A strut 20 is supported on each of the seats 19. The struts are formed with curved, or cylindrical, outer ends engaging correspondingly formed sockets in brake shoes 21 and with suitably curved inner ends adapted to roll on plane surfaces formed on seats 19.

The brake shoes have suitable leather facings which rub against the cylindrical inner wall of member 11. Tension devices are provided which tend to hold the struts against the backs of their respective seats 19, said devices, as clearly shown in Fig. 3, comprising coiled springs 22 provided at one end with heads engaging resilient shims lying against the faces of the struts and at the other end with conical heads engaging sockets formed in the triangular members 18. The inner faces of seats 19 are inclined, as clearly shown in Fig. 4, and engage correspondingly inclined faces of a triangular abutment member 23, the seats being thus rigidly held against radial movement inwardly.

The absorber, as thus far described, acts in the following manner:—When the car strikes an obstruction or depression the springs S flex downward and cause arm 17 and the rotatable parts of the absorber to move in a counter-clockwise direction, looking at Fig. 1; in a clockwise direction, looking at Fig. 3, the latter being a view of the side opposite to that shown in Fig. 1. Rotating in this direction the absorber offers little resistance to the relative movement between the vehicle frame and axle, since the lower ends of the struts 20 roll freely on the plane surfaces of seats 19 substantially relieving the frictional engagement of the brake shoes with the cylindrical member 11. On the rebound, arm 17 and the movable parts of the absorber rotate in a counter-clockwise direction, looking at Fig. 3, and in this direction the angle of thrust of the struts cause the brake shoes to frictionally engage member 11 and thus resist the rebounding movement with a force which is proportional to the thrust angle.

Due to the wear of the friction parts it is obvious that the effectiveness of the absorber would progressively become less with the extent of use unless some means of adjustment were provided to take up the looseness developed. The present invention is directed to adjusting means for this purpose. Mechanism embodying the invention will now be described.

Referring first to the form of the invention shown in Figs. 4 and 5, it will be observed that the abutment member 23 is threaded on a stem 24 which has a rounded inner end engaging the center of disk member 14 and has an outer polygonal end projecting through an enlarged central aperture in a circular plate 25. Plate 25 is attached by screws 26 to the tops of the triangular guide members 18, these members 18 projecting beyond the plane of the tops of their companion members 18'. On the polygonal end of stem 24 is a drum 27 surrounding which is a split resilient band 28 having a friction facing rubbing on drum 27 and held against the drum with a predetermined pressure by means of a split resilient ring 29. Band 28 is provided with lugs 30 which pass through apertures in an annular ratchet member 31 formed with ratchet teeth adapted to engage the end of a screw 32 in the base member 10, a coil spring 33 yieldingly holding member 31 engaged with the screw.

From the foregoing description it will be clear that when the absorber is operating the strut seats 19, abutment 23, stem 24 and drum 27 oscillate with arm 17. Normally, drum 27 rotates ratchet ring 31 in one direction by reason of its frictional connection therewith, the ring in this movement ratcheting under screw 32, but in the reverse rotation the faces of the ratchet teeth engaging the screw holds the ratchet ring and friction band 28 relatively stationary, the drum slipping in the friction band. Thus in the last named direction of rotation there is a torque tending to rotate the threaded stem 24 in the nut, or abutment, member 23. When the parts have become sufficiently worn to require adjustment this torque causes rotation of stem 24 with respect to abutment member 23 in a direction to move said member outwardly along the inclined faces of the strut seats 19, moving the seats outwardly until all looseness has been taken up, whereupon the drum 27 will continue to slip in the friction ring until looseness again develops.

It is desirable to produce the adjusting torque of the device in the free movement of the absorber, for the reason that in the resistance producing movement the parts are under tension and a relatively large torque would be required to produce an adjusting movement of member 23, necessitating a powerful adjusting mechanism and an expensive construction. On the other hand, by arranging the parts so that the torque is produced in the free swing of the absorber, an adjusting mechanism of light and cheap construction is entirely satisfactory. The parts have accordingly been arranged to produce the adjusting torque in the free swing of the absorber, as will be clear from a consideration of Figs. 4 and 5. As will be observed, when arm 17 swings upwardly, Fig. 4, which it does freely, ratchet ring 31 is held relatively stationary by screw 32, producing a torque on stem 24 tending to rotate the stem with respect to abutment member 23 in a direction to move said abutment inwardly along the inclined faces of the strut seats 19 and hence to move said seats radially outward.

The invention is susceptible of embodiment in various forms, as it is obvious that various mechanisms for producing step by step adjustment of stem 24 actuated by some oscillating element of the absorber can be devised. The form described is the one at present regarded as preferable, but other forms may be employed and give perhaps equally as good results.

Figs. 6 and 7 show a form of the invention operating on the same principle as that of the form just described, but having its elements substantially modified. In this form, a conical drum 40 is provided with a polygonal hub fitting the polygonal end of stem 24. Disposed over drum 40 is a friction cone 41 having a facing of friction material 42 and formed on its upper side with ratchet teeth adapted to be engaged by teeth projecting from the under side of a plug 43 screwed in a central aperture of base member 10. Fastened on plate 25 beneath drum 40 is a semicircular leaf spring 44 whose upturned ends engage the under side of the drum and exert an upwardly directed pressure thereon which serves to produce the required frictional engagement of the cones and to hold the upper cone yieldingly against the teeth on plug 43. This spring 44 may also if desired serve to prevent reverse rotation of stem 24. For this purpose the free ends of the spring engage ratchet teeth formed on the under side of drum 40, preventing rotation of drum 40 and stem 24 with respect to disk 25 and abutment 23 and the other rotating parts of the absorber except in one direction, this direction being that in which the relative rotation of the stem is produced by the torque exerted on drum 40 in the free swing of the absorber. It will be observed from the drawing that in the resistance producing rotation the teeth on plug 43 ratchet over the teeth on the upper cone 41, while in the reverse, or free rotation the upper cone is held relative stationary, producing a torque on stem 24 proportional to the friction between the cones, such torque being insufficient to rotate the stem when the parts are in proper adjustment but being sufficient to rotate the stem when any looseness develops and thus move the abutment member 23 inwardly along the inclined faces of the strut seats until such looseness has been taken up. When stem 24 has been thus rotated relative rotation thereof in the reverse direction is prevented by engagement of spring 44 with the teeth on the under face of drum 40.

A third form of the invention is illustrated in Figs. 8 and 9. Here the square end of stem 24 loosely carries two ratchet wheels 50 and 51, the wheels being superposed and held in spaced relation by spacers 52 attached to plate 25. A spring pressed pawl 52ª pivoted on plate 25 engages teeth of the lower wheel 50 and a spring pressed pawl 53 pivoted on a pin 54 secured to base member 10 engages teeth of the upper ratchet wheel 51. The leaf spring 55 holding pawl 53 against the ratchet wheel engages at its free end an eccentric 56 on a stud 57 passing through an aperture in the base member and fastened exteriorly by a nut 58. From Fig. 9 it will be seen that the faces of the upper ratchet wheel 51 are inclined with respect to a diametrical plane in such a direction that the line of application of the force applied to the pawl when torque is exerted on ratchet wheel 51 in a clockwise direction passes outside of the pivot 54 of said pawl, and it will be clear that the pawl 53 will be displaced to permit ratchet wheel 51 to rotate in a clockwise direction whenever the force tending to rotate ratchet wheel 51 in this direction exceeds a predetermined value. This angle will depend obviously on the face angle of the ratchet teeth and on the tension of spring 55, which latter may be adjusted by the eccentric 56. In the resistance producing swing of the absorber, the ratchet wheels and the plate 25 will rotate in a counterclockwise direction, looking at Fig. 9, pawl 53 ratcheting over the teeth of wheel 51 and pawl 52ª and wheel 50 moving together. In the free swing the wheels and plate rotate in a clockwise direction, pawl 53 tending to hold ratchet wheel 51 relatively stationary. If the absorber is in proper adjustment stem 24 will be constrained to rotate with abutment member 23 and the other moving parts of the absorber and consequently pawl 53 will slip over the teeth of ratchet 51. On the other hand, when looseness has developed sufficiently to permit adjustment of abutment member 23, pawl 53 will hold wheel 51 relatively stationary in the free swing of the absorber, causing abutment member 23 to rotate on stem 24 and thus move inwardly to take up such looseness.

Three forms of the invention have been described. Other substantially different forms will readily occur to those skilled in the art. It is therefore not intended to limit the invention by any specific description.

Having thus described the invention what is claimed as new and desired to be secured by Letters Patent is:

1. A shock absorber of the kind described comprising, in combination, a cylindrical casing and a core rotatable therein, brake shoes in the casing engaging the cylindrical walls thereof, means mounted on the core for causing frictional engagement of the shoes with the casing in one swing of the core and for relieving such engagement in the opposite swing, comprising struts engaging the shoes and radially movable seats for the inner ends of the struts, and means for automatically adjusting the seats when looseness develops in the absorber comprising an abutment member engaging the inner faces of the seats, a screw threaded in the abutment member and friction mechanism connected to the screw tending to hold the screw relatively stationary in one swing of the absorber but permitting free rotation thereof with the abutment member in the opposite swing.

2. A shock absorber of the kind described comprising in combination, a cylindrical casing and a core rotatable therein, brake shoes in the casing engaging the cylindrical wall thereof, means mounted on the core for causing frictional engagement of the shoes with the casing in one swing of the core and relieving such engagement in the opposite swing, comprising struts engaging the shoes and radially movable seats for the inner ends of the struts, and means for automatically adjusting the seats when looseness develops in the absorber comprising an abutment member having inclined faces engaging the inner faces of the seats, an axially disposed screw threaded in the abutment member, and friction means tending with a predetermined substantially constant force to hold the screw relatively stationary in one swing of the absorber but permitting free rotation thereof with the abutment member in the opposite swing.

3. A shock absorber of the kind described comprising, in combination, a cylindrical casing and a core rotatable therein, brake shoes in the casing engaging the cylindrical wall thereof, means mounted on the core causing frictional engagement of the shoes with the casing in one swing of the core and relieving such engagement in the opposite swing, comprising struts engaging the shoes and radially movable seats for the inner ends of the struts, and means for automatically adjusting the seats when looseness develops in the absorber comprising an abutment member having inclined faces engaging the inner faces of the seats, an axially disposed screw threaded in the abutment member and ratchet mechanism frictionally connected to the screw tending to hold the screw relatively stationary in the free swing of the core but permitting free rotation thereof with the abutment member in the resistance producing swing.

4. A shock absorber of the kind described including, in combination, a cylindrical casing adapted to be secured to the frame of an automobile, a rotatable core in the casing adapted to be connected to the axle so as to oscillate on relative movement of the frame and axle, brake shoes engaging the inner cylindrical wall of the casing, means mounted on the core causing frictional engagement of the shoes with the casing in one direction of rotation and relieving such engagement in the opposite direction, comprising struts engaging the shoes and radially movable seats for the inner ends of the struts having inclined inner faces, and means for automatically adjusting said seats when looseness develops in the absorber comprising an abutment member having inclined faces engaging the inclined faces of the seats, an axially disposed screw threaded in the abutment member and ratchet mechanism frictionally connected to the screw tending to hold it relatively stationary in the free swing of the absorber and permitting free rotation thereof with the abutment member in the resistance producing swing.

5. In a shock absorber having a relatively stationary casing and a rotatable core therein, brake shoes in the casing, mechanism carried by the core for causing frictional engagement of the shoes with the casing in one direction of rotation and relieving such engagement in the opposite direction of rotation, and friction means for adjusting said mechanism step by step actuated automatically by the relative movement of the core with respect to the casing in one direction.

6. In a shock absorber having a relatively stationary casing and a core rotatable therein, brake shoes in the casing, mechanism mounted on the core causing frictional engagement of the shoes in one direction of rotation and relieving such engagement in the opposite direction, a ratchet wheel frictionally connected to said mechanism for effecting a step by step adjustment thereof when looseness develops, and a dog mounted on the casing adapted to hold said wheel relatively stationary in the free rotation of the core.

7. In a shock absorber having a relatively stationary casing and a core rotatable therein, brake shoes in the casing, mechanism mounted on the core causing frictional engagement of the shoes in one direction of rotation and relieving such engagement in the opposite direction and means for effecting a step by step adjustment of said mechanism when looseness develops in the absorber comprising a screw coaxial with the core and normally rotating therewith and a slipping connection between the screw and casing tending to hold the screw relatively stationary in one direction of rotation of the core.

8. In a shock absorber having a relatively stationary base and a rotatable core, brake shoes frictionally engaging the base, mechanism mounted on the core causing frictional engagement of the shoes in one direction of rotation and relieving such engagement in the opposite direction, and ratchet devices automatically effecting a step-by-step adjustment of said mechanism when looseness develops therein.

9. In a shock absorber having a relatively stationary base and a rotatable frame, brake shoes frictionally engaging the base, mechanism mounted on the frame causing frictional engagement of the shoes in one direction of rotation and relieving such engagement in the opposite direction, and means for automatically adjusting said mechanism comprising a wedge engaging said mechanism, a screw threaded in said wedge, and a slipping connection between the screw and base adapted to slip when a predetermined torque is applied to the screw.

10. In a shock absorber having a relatively stationary base and a rotatable frame, brake shoes frictionally engaging the base, mechanism mounted on the frame causing frictional engagement of the shoes in one direction of rotation and relieving such engagement in the opposite direction, and means for automatically adjusting said mechanism when looseness develops therein comprising a wedge engaging said mechanism, a screw threaded in said wedge coaxial with the frame and normally rotating therewith and ratchet mechanism frictionally connected to said screw tending to hold the screw relatively stationary in one direction of rotation of the frame.

11. In a shock absorber having adjustable friction producing mechanism, a screw adapted and arranged to adjust such mechanism to produce a predetermined friction, and a ratchet device for automatically turning said screw to maintain such adjustment.

12. A shock absorber provided with friction producing mechanism, means for adjusting said mechanism, and a ratchet device operating on such means to take up wear in the friction producing mechanism.

13. A shock absorber of the friction type provided with adjusting mechanism which includes a screw and a ratchet device for automatically turning the screw in the ordinary operation of the shock absorber.

14. In a shock absorber, an adjusting mechanism comprising a screw member and a nut member threaded thereon, a ratchet device for automatically rotating one of said members in the ordinary operation of the shock absorber and means to prevent the rotation of the other of said members.

15. The combination with the vehicle provided with a body, an axle, and a spring intermediate the body and axle, of a shock absorber for damping the spring action during road travel, said shock absorber having adjusting means and ratchet mechanism for effecting the adjustment thereof automatically brought into operation by the occurrence of relative movement between the body and axle.

16. The combination with a vehicle having a body member, axle member and spring intermediate the body member and axle member, means for damping the action of the spring comprising a shock absorber secured to one of said members and operatively connected to the other, said absorber having adjusting mechanism and power operated means for effecting adjustment intermittently and only upon the occurrence of a predetermined amount of wear in its operating parts, the power for operating said means being transmitted thereto by said connection and resulting from relative movement of the body and axle.

17. A shock absorber having two relatively movable parts, and an adjusting mechanism, and ratchet means for effecting the step by step operation of said mechanism upon the occurrence of relative movement between said members.

In testimony whereof I hereunto affix my signature.

JAMES PIERCE BALDWIN.